United States Patent
Bogdanowicz et al.

(10) Patent No.: US 11,816,092 B2
(45) Date of Patent: Nov. 14, 2023

(54) SYSTEM AND METHOD FOR AUTOMATIC APPLICATION LOG MESSAGES GROUPING USING LOGGING FRAMEWORK CODE INSTRUMENTATION

(71) Applicant: Dynatrace LLC, Waltham, MA (US)

(72) Inventors: Damian Bogdanowicz, Gdansk (PL); Krzysztof Hoja, Gdansk (PL)

(73) Assignee: Dynatrace LLC, Waltham, MA (US)

( * ) Notice: Subject to any disclaimer, the term of this patent is extended or adjusted under 35 U.S.C. 154(b) by 359 days.

(21) Appl. No.: 17/092,655

(22) Filed: Nov. 9, 2020

(65) Prior Publication Data

US 2022/0147507 A1 May 12, 2022

(51) Int. Cl.
| | |
|---|---|
| *G06F 16/23* | (2019.01) |
| *G06F 8/70* | (2018.01) |
| *G06F 11/30* | (2006.01) |
| *G06F 11/34* | (2006.01) |

(52) U.S. Cl.
CPC ............ *G06F 16/2365* (2019.01); *G06F 8/70* (2013.01); *G06F 11/3006* (2013.01); *G06F 11/3476* (2013.01); *G06F 11/3495* (2013.01)

(58) Field of Classification Search
CPC ............ G06F 11/3495; G06F 11/3476; G06F 11/3006; G06F 8/70; G06F 16/2365
USPC .......................................................... 707/690
See application file for complete search history.

(56) References Cited

U.S. PATENT DOCUMENTS

| | | | |
|---|---|---|---|
| 10,484,234 B1* | 11/2019 | Sun | H04L 41/0631 |
| 2003/0005021 A1 | 1/2003 | Shah et al. | |
| 2004/0226007 A1 | 11/2004 | Guarraci | |
| 2013/0036404 A1 | 2/2013 | Shu et al. | |
| 2014/0082513 A1 | 3/2014 | Mills et al. | |
| 2017/0124110 A1* | 5/2017 | Hajj | H04L 67/567 |
| 2018/0084073 A1* | 3/2018 | Walsh | G16Y 40/35 |
| 2018/0246797 A1* | 8/2018 | Modi | G06F 11/3476 |
| 2019/0324834 A1 | 10/2019 | Vedurumudi et al. | |
| 2019/0385113 A1* | 12/2019 | Dumitras | G07C 1/10 |
| 2020/0201699 A1* | 6/2020 | Yu | G06F 11/0769 |
| 2020/0226214 A1* | 7/2020 | Reddekopp | G06N 20/00 |
| 2020/0285773 A1* | 9/2020 | Malecki | G06F 21/602 |
| 2020/0313878 A1* | 10/2020 | Wang | G06F 16/1734 |

\* cited by examiner

*Primary Examiner* — Hosain T Alam
*Assistant Examiner* — Nicholas E Allen
(74) *Attorney, Agent, or Firm* — Harness, Dickey & Pierce, P.L.C.

(57) ABSTRACT

A system and a method for grouping log lines in application log file is presented. The system uses logging framework code instrumentation in order to obtain a relation between the actual log line and the place in source code from which a method responsible for writing the line has been called. As the all information on the relation is stored in external metadata files, the structure of the log files remains unchanged. Using the above mentioned metadata and a raw log file, each log line in the file can be assigned to a group related to the place in source code from which the line has been logged, by the system. Next such a grouped log file can be displayed to the user in order to simplify the analysis of the application behavior.

22 Claims, 7 Drawing Sheets

System Overview

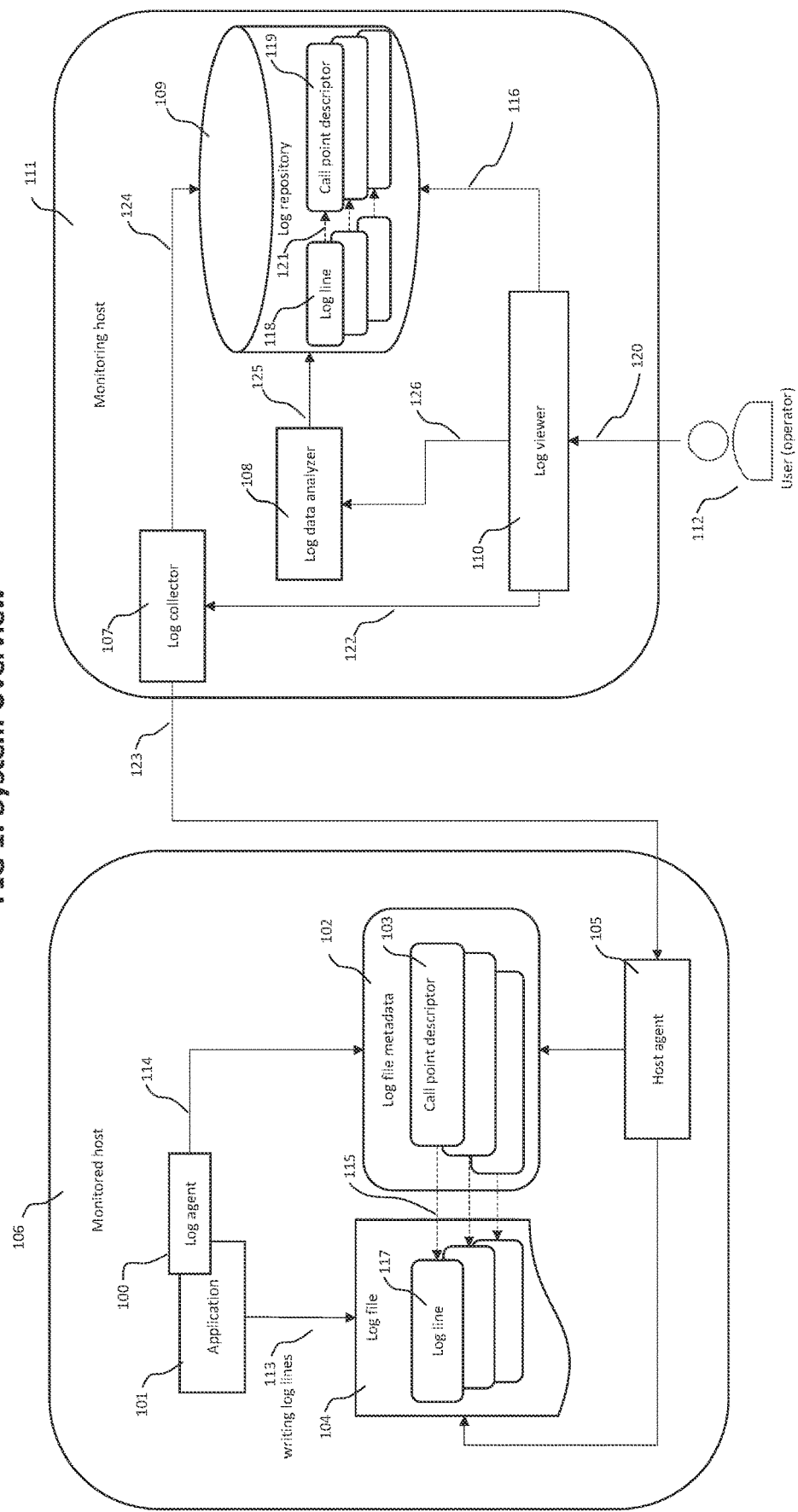
FIG 1: System Overview

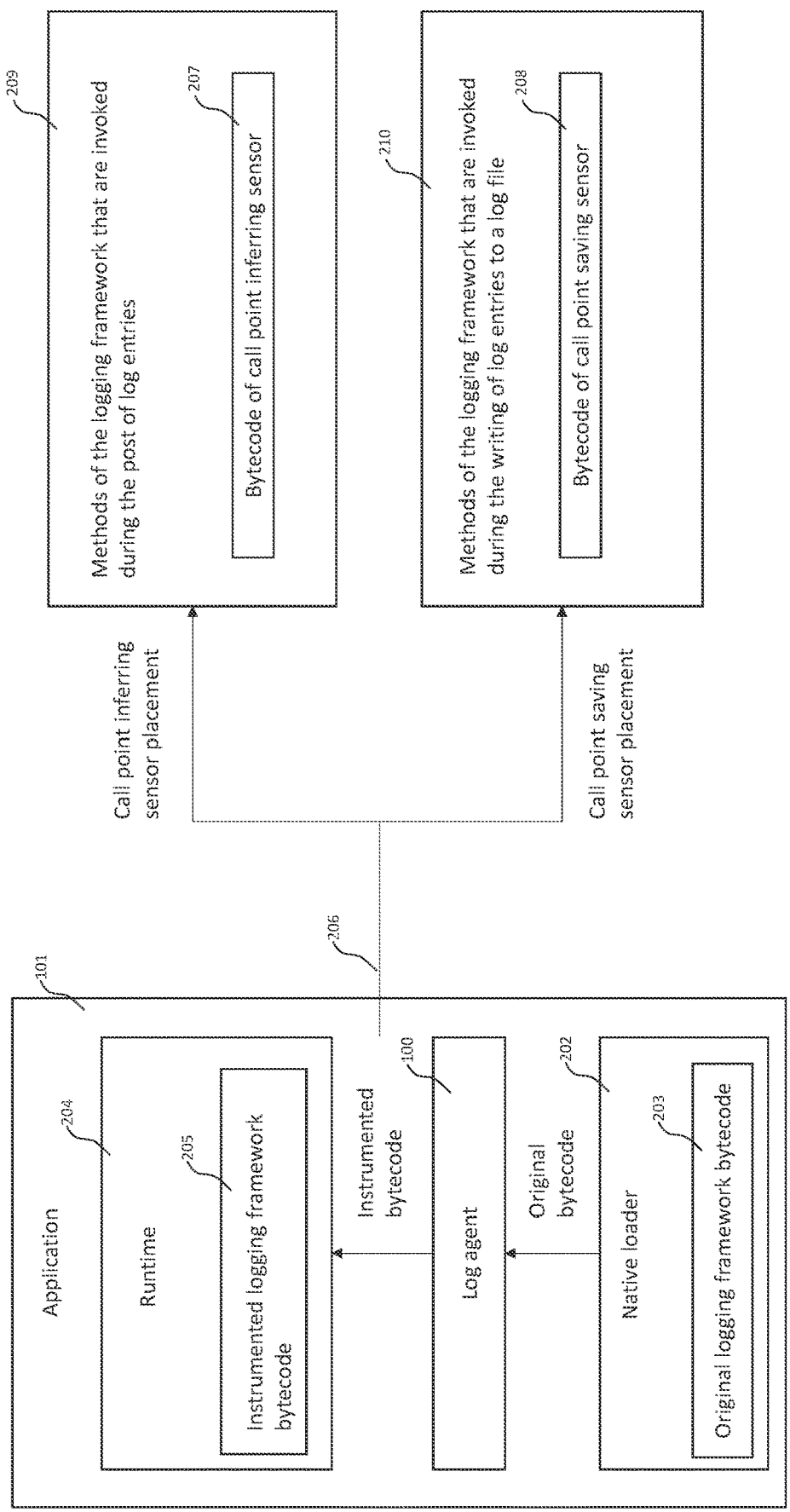

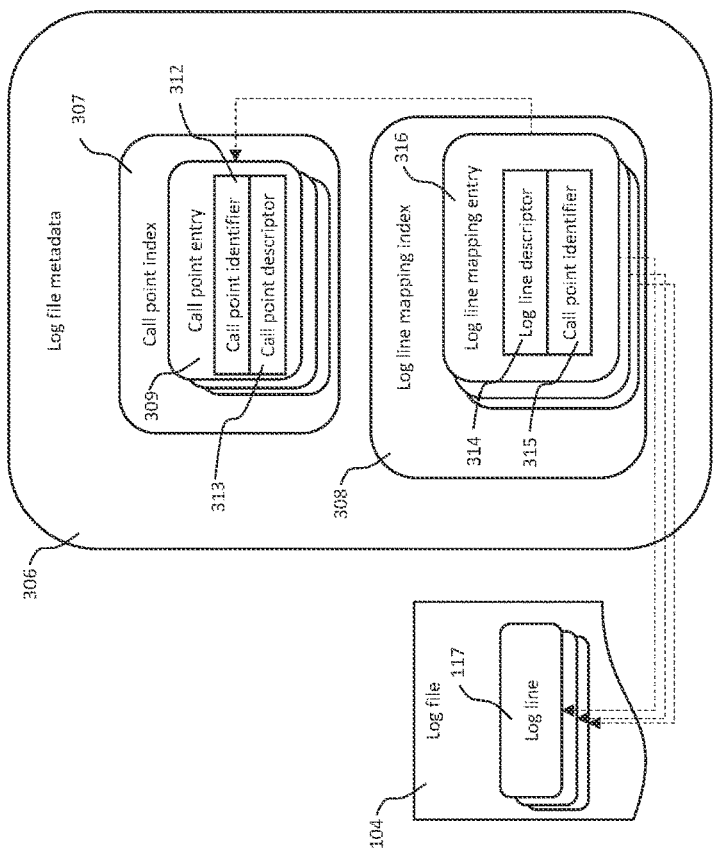
FIG 3b: Space efficient approach with two indexes
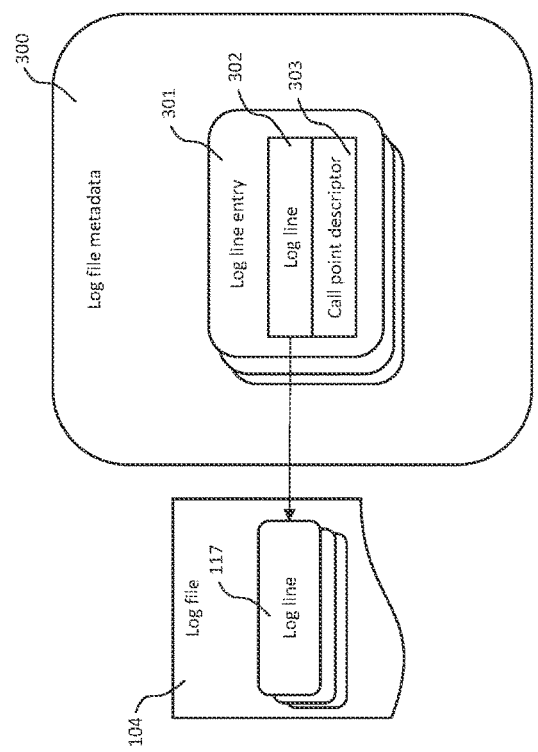
FIG 3a: Full log data duplication

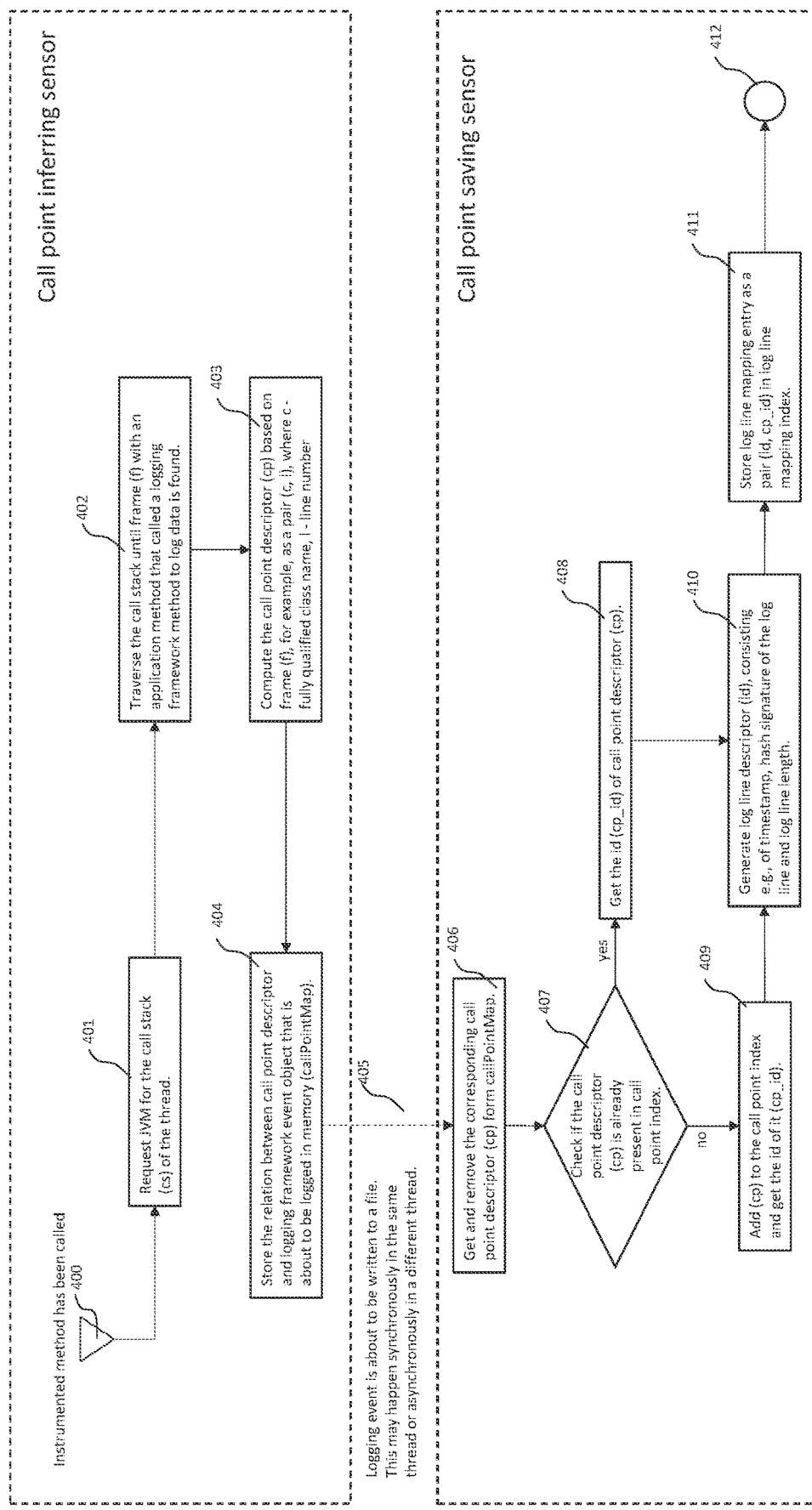

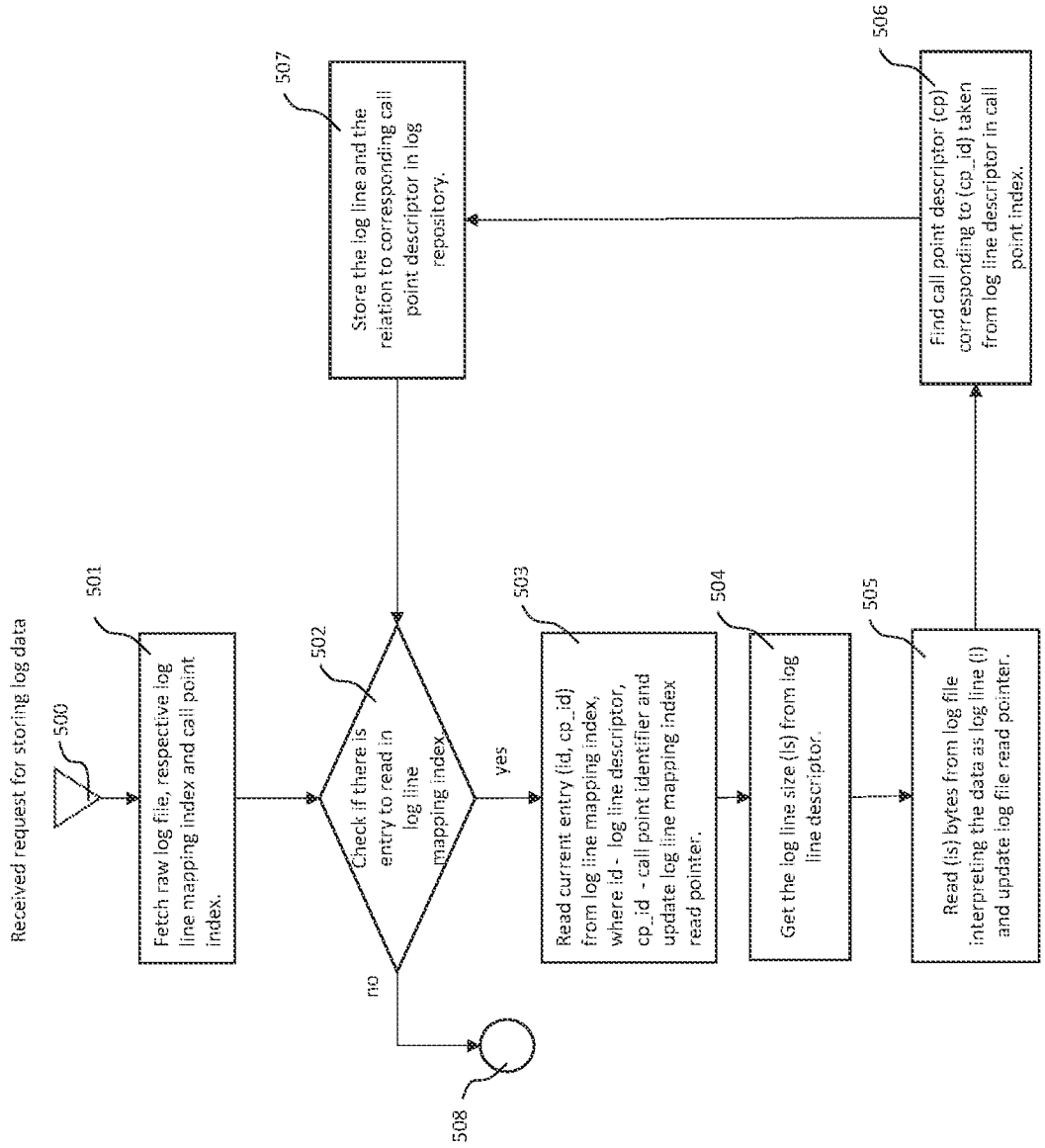

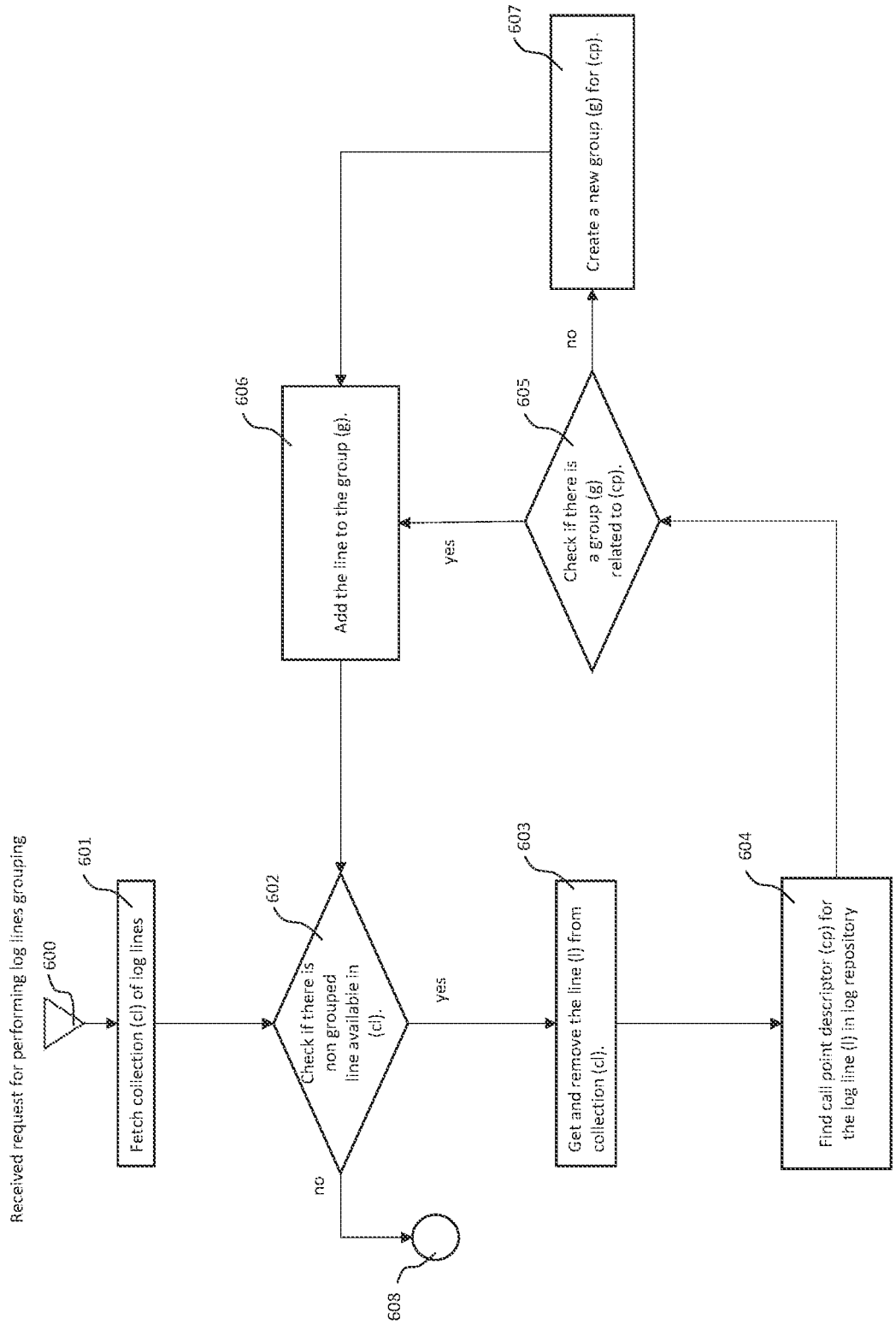

FIG 7a: Example of class source code with line numbers

```
1  package sample.app;
2
3  import org.slf4j.Logger;
4  import org.slf4j.LoggerFactory;
5
6  public class SampleClass {
7     private final static Logger logger = LoggerFactory.getLogger(SampleClass.class);
8
9     public void testMethod() {
10        logger.info("Test info message1");
11        logger.info("Test info message2");
12    }
13 }
```

FIG 7b: Code arrays for the class

```
public class sample.app.SampleClass {
  public sample.app.SampleClass();
    Code:
       0: aload_0
       1: invokespecial #1        // Method java/lang/Object."<init>":()V
       4: return public void testMethod();
    Code:
       0: getstatic     #2        // Field logger:Lorg/slf4j/Logger;
       3: ldc           #3        // String Test info message1
       5: invokeinterface #4, 2   // InterfaceMethod org/slf4j/Logger.info:(Ljava/lang/String;)V
      10: getstatic     #2        // Field logger:Lorg/slf4j/Logger;
      13: ldc           #5        // String Test info message2
      15: invokeinterface #4, 2   // InterfaceMethod org/slf4j/Logger.info:(Ljava/lang/String;)V
      20: return static {};
    Code:
       0: ldc           #6        // class sample/app/SampleClass
       2: invokestatic  #7        // Method org/slf4j/LoggerFactory.getLogger:(Ljava/lang/Class;)Lorg/slf4j/Logger;
       5: putstatic     #2        // Field logger:Lorg/slf4j/Logger;
       8: return
}
```

SYSTEM AND METHOD FOR AUTOMATIC APPLICATION LOG MESSAGES GROUPING USING LOGGING FRAMEWORK CODE INSTRUMENTATION

FIELD OF THE DISCLOSURE

The presented disclosure relates to the first phase of automatic log messages analysis which is usually known as log parsing. One of the main goals of log parsing is the categorization of individual log lines to groups describing application events of the same type with possibly different event parameters.

BACKGROUND

Computer systems are becoming an indispensable part of our everyday life. Software systems control traffic lights, railway and flight operations, manage the credit card payments, provides us with personalized information, and are present in almost all branches of industry and services. Simultaneously, the complexity of such systems is continuously increasing, while the requirement for their operability becomes even more important. The maintenance of such systems becomes a critical, yet a very complex task.

Application log files are invaluable and often even indispensable sources of information on the computer system health. Such files typically contain various types of messages informing about current activities performed by a system, encountered warning states and errors. A log file is usually composed of a sequence of log lines. The log line format heavily depends on logging framework type used in the application and its configuration. However, in most cases, a log line contains the following three types of information (called fields), i.e., timestamp, log level (e.g., INFO for statement describing normal behavior, WARN, ERROR for abnormal situations), and a human readable message describing the activity or state. E.g.: "2019-02-24 14:39:15,896+0100 INFO [ConfigurationGetTask] Getting configuration from device 10.10.10.1:443, for user sampleUserName finished in 0s", where timestamp "2019-02-24 14:39:15,896+0100" appears as the first field, "INFO" is the log level, and the actual message "[ConfigurationGetTask] Getting configuration from device 10.10.10.1:443, for user sampleUserName finished in 0s" appears as the last part of the log line. In general, there is no restriction on the content of log line message part, so it is not so uncommon that a single message is composed of multiple lines, what for instance, is a very popular practice for logging exceptions. Here, by a log line we will denote a part of a log file corresponding to a single event in the application, which is composed of a timestamp of the event, an actual log message (possibly containing new line characters) and optionally additional fields describing the event, e.g., severity.

The number of log lines that an application can write in a given period depends on its specific design, configured log details level and the external conditions under which the application is working (e.g., number of end users). The overall complexity of the systems is correlated with the number of diagnostic information in their application logs. Hence, analyzing raw log files can be a very tedious task. Therefore, intelligent log viewer applications try to group related log lines and show them as a single category to the user. All the log lines within such a group should concern the same event type with the same or different parameter values. An event type is represented by all possible log lines that can be obtained from a particular log message template placed in a source code, e.g.: "2019-02-24 14:39:15,896+0100 INFO [ConfigurationGetTask] Getting configuration from device 10.10.10.1:443, for user sampleUserName finished in 0s" and "2019-02-24 14:55:16,816+0100 INFO [ConfigurationGetTask] Getting configuration from device 10.15.10.235:80, for user sampleUserName finished in 2.3 s" represent the same application event type since both the lines come from the same template and the same line in the source code, i.e.: "LOG.info(MessageFormat.format("Getting configuration from device {0}, for user {1}finished in {2}s", device.getIp( ), device.getUser( ), stopper.getTotalTime( )));"

However, the task (usually referred to as log parsing) of efficiently inferring the correct event templates from a list of log lines using only a log file content is challenging and as such is still the subject of many current research projects, see for example "An Evaluation Study on Log Parsing and Its Use in Log Mining" or "Towards Automated Log Parsing for Large-Scale Log Data Analysis" both by P. He et al.

Among others, the following two aspects make it difficult. First, based on a single log line, it is often not possible to tell which of the tokens should be treated as parameters and which should be the part of the template. Although, some heuristic approaches can be used, e.g., it may be assumed that all numbers can be parameters, it is still unclear how to recognize variable parts consisting of only alphabetical characters, (e.g., state names like "RUNNING", "STOPPING", class names, method names, file names, entity identifiers like urls or host names). Second, due to usually large volume of data, simple approaches based on pairwise comparison of all the analyzed log lines and application of a similarity threshold to obtain log line clusters allowing on inference about the possible templates structure are often inefficient, thus their practical usage is very limited.

This section provides background information related to the present disclosure which is not necessarily prior art.

SUMMARY

The present disclosure is directed to a method of identifying and grouping log lines corresponding to the same event type indirectly, without the actual analysis of the log lines content. In one example, such an assignment is performed based on the call point, described as a pair consisting of fully qualified class name and line number of the actual logging framework method invocation, as in majority of real word cases a single source code line contains at most one call for logging data. The above-mentioned call point is obtained through bytecode instrumentation of a particular logging framework methods, so as to be able to infer the call point from the application call stack when an actual method responsible for logging data is invoked by application code. The proposed approach is also capable to distinguish log lines that originated from different locations in application source code, even if the created log lines contain identical messages.

As the present disclosure uses the mechanism of bytecode instrumentation, it is applicable to the applications running in environments where such a dynamic modification is supported such as Java Virtual Machine or .NET platform. The mentioned systems provide interfaces enabling the injection of agents into the process of bytecode interpretation done by the virtual machines, which allows on performing suitable instrumentation to record the above-mentioned call point. Using supported logging framework and installation of such a specialized agent are the main applicationside requirements for the method to work. There is no need to make any changes in monitored application source code nor in its configuration.

The information on the call point for a particular log line is stored in separate metadata files on the monitored host, therefore the application log files remain unchanged. Restoring the relation between a particular log line and its call point, which also identifies the corresponding event type, can be done efficiently by reading jointly application log file and created helper files.

BRIEF DESCRIPTION OF THE DRAWINGS

The drawings described herein are for illustrative purposes only of selected embodiments and not all possible implementations and are not intended to limit the scope of the present disclosure.

FIG. 1 contains a block diagram of a log analysis system using data gathered via code instrumentation to present log lines grouped based on originating event type.

FIG. 2. illustrates the process of instrumenting application in order to place desired sensors.

FIGS. 3A and 3B illustrate examples of possible approaches to log file metadata organization.

FIG. 4 provides a flow chart that describes actions that are taken by log agent and its sensors when instrumented logging framework method is called by the monitored application.

FIG. 5 contains a flow chart that describes actions performed by log data collector to store log lines together with corresponding call point descriptors in log repository.

FIG. 6 contains a flow chart that describes actions performed by log data analyzer to provide grouping of log lines responsible for the same application event type.

FIGS. 7A and 7B contain an example of Java source code for a simple class and corresponding bytecode arrays with bytecode indices, respectively.

DETAILED DESCRIPTION

The bytecode-based software platforms like Java Virtual Machine or .NET framework provide interfaces to intercept the startup of virtual machines, to inject custom code into the virtual machines and to execute this code under control of the virtual machine. The presented disclosure uses this mechanism to alter the bytecode of logging framework methods. When instrumented methods are invoked, the altered bytecode (sensors) perform operations allowing on getting and analyzing current thread call stack to find the call point of the log framework method in the monitored application (i.e., the point in application code from which a logging framework method has been invoked) and storing the information on assignment of the particular log line to the call point for later analysis. While reference is made throughout this disclosure to the Java software platform, it is readily understood that the claimed techniques are applicable to other software platforms as well. One of the possible ways to identify the call point is by using the pair consisting of fully qualified class name and source code line number. In another variant which will be also discussed, we will additionally use a method signature and an index from compiled code in place of code line number. In general we will use the term call point descriptor for data that can be used to identify the call point (i.e. code location) in an application that performs logging activities.

Exemplary embodiment of a log analysis system for grouping related log lines is presented in FIG. 1. User 112, often called operator, accesses log data produced by application 101 running on a monitored host 106 via log viewer 110, which provides diagnostic web interface. In order not to introduce additional performance overhead on monitored application 101, log viewer 110 with related components is running on a separate monitoring host 111. Application 101 is a process running on monitored host that supports code instrumentation, typically this can be a computer program running on some virtual machine such as Java Virtual Machine (JVM) or .NET platform. From now, if not stated explicitly, it is assumed that the monitored application is a Java process running on JVM although this disclosure is not limited thereto.

During application 101 startup, the log agent 100 as depicted in FIG. 2, analyzes classes to be loaded by JVM using native loader 202 and performs instrumentation 206 of certain logging framework methods 203 by placing 206 two different types of sensors. Load-time instrumentation presented in FIG. 2 is one example of possible instrumentation types that can be used for placing sensors. Another possibility is to use run-time instrumentation, for example as discussed in U.S. Pat. No. 8,402,443 entitled "Method and system for automated analysis of the performance of remote method invocations in multi-tier applications using bytecode instrumentation" and incorporated by reference herein. The first sensor type is a call point inferring sensor 207, which is placed in methods 209 of a particular logging framework that are invoked by application code to log messages. Alternatively, the call point inferring sensor may be placed in one or more internal methods of a logging framework to which log methods that are directly invoked by the application delegate. Potential locations for call point inferring sensors include internal methods which are directly called by logging methods and internal methods that are called indirectly, via one or more intermediate internal methods. For example, the first sensor type may be instrumented in put( . . . ) method of ch.qos.logback.core.AsyncAppenderBase class of one of popular Java logging framework Logback, which may appear on call stack as a result of using org.slf4j.Logger.info ("Sample message") method in monitored application to log data. The sensor 207 infers the call point descriptor based on obtained call stack in current thread and stores the assignment between log entry and call point descriptor in memory. The second sensor type, the call point saving sensor 208, is placed into the bytecode of one or more methods of the logging framework that are invoked during the writing of log entries to files 210, e.g., in methods subAppend( . . . ), writeBytes( . . . ) of ch.qos.logback.core.OutputStreamAppender class of Logback framework. The idea behind splitting the functionality into two types of sensors comes from the fact that the final format of log line written to log file, which depends on the particular logging framework and its configuration, may not be determined in the methods that are invoked during the post of log entries, but rather in different logging framework methods executed right before actual writing operation. Therefore, the sequence of bytes defining the log line could not be easily accessible for call point inferring sensor 207, but it should be for call point saving sensor 208.

While a logging framework method that is responsible for writing an application state to log file is executed, but before the actual operation of writing the data to a file 113 (due to injection of sensors illustrated in FIG. 2) additional activities are performed. First, call point inferring sensor 207 is activated to get and analyze current stack trace to find the call point descriptor. Next 114, call point saving sensor 208 using suitable log agent code writes metadata 102 allowing an assignment 115 the call point descriptor 103 to the log line 117 that is about to be stored.

Various approaches can be used to persist the log line-call point descriptor assignment 115. One of the simplest strategies is to create log file metadata 300, where the log line entries 301 are composed of the whole log line 302 and a call point descriptor 303 as presented in FIG. 3*a*. However, such a strategy uses a lot of disk space to store full duplication of log data. Another approach, in which log data is not duplicated, involves including call point descriptors in application log file 104 itself, thereby modifying the original log line format 117. In this case, the additional metadata files are not needed. However, such a modification may not be acceptable by application users, who, for instance, may have already configured various external or internal (being part of the application) tools for processing the log files expecting the originally configured log line format.

Another approach, which does not have any of the above-mentioned disadvantages is presented in FIG. 3*b*. Here, the log file metadata 306 is organized as two index files 307, 308. One of the index files, called the call point index 307, stores call point entries 309 consisting of a call point identifier 312 and the call point descriptor 313. The second index file, called log line mapping index 308, contains log line mapping entries 316 defined as pairs of the following records: log line descriptor 314 and call point identifier 315. Call point identifier 315 is a simple reference to call point index, whereas log line descriptor 314 contains information which enables matching of the entry with a particular log line 117. The main purpose of decoupling call point storage from log line descriptor storage is reducing the disk space needed to save the information on the relation between a log line 117 and its call point descriptor 313. Call point 307 and log line mapping 308 indexes can be implemented as simple structured text or binary files. Using only one index file with entries consisting of log line descriptor and call point descriptor can be an alternative, which is slightly simpler than two-index approach, but requires more disk space.

Next, the detailed description of tasks performed by call point saving sensor 208 is provided, assuming that two-index approach as presented in FIG. 3*b* is chosen.

First, call point saving sensor 208 using suitable log agent 100 code writes data about the call point descriptor 313 to call point index 307. Only entries that currently do not exist in the call point index 307 are appended to it. Next, call point saving sensor 208 writes log line mapping entries 316 to log line mapping index 308, one for each application log line 117. Log line mapping entry 316 besides call point identifier 315 contains log line descriptor 314, which should contain information allowing to match the entry with a particular log line 117. Different strategies can be used to ensure the above-mentioned correspondence, which also determines the steps that have to be performed by log collector 107 to recreate the relation based on collected data, i.e.: log file 104, call point index 307 and log line mapping index 308. Some possible approaches are described below.

1. Empty descriptor, i.e., the log line mapping entry 316 contains only call point identifier 315—here, in order to recreate the relation, log collector 107 has to be able to split application log file 104 into log lines 117 based on the log file content, and the order of entries in log line mapping index 308 has to be in sync with application log file 104. In these cases there is no data to validate correctness of retrieved mapping.

2. Timestamp and hash signature—here, similarly to the first case, log collector 107 has to be able to split application log file 104 into log lines 117, then based on hash signature, relation between log line 117 and log line mapping entry 316 can be retrieved. Timestamp, assuming that log collector 107 is able to parse it from log line, can be used as an additional source of information to create or validate existing mappings obtained from hash signature comparison.

3. Timestamp, hash signature and log line size—in the case assuming that the order of entries in log line mapping index 308 is in sync with application log file 104, log collector 107 can use the information about log line size to split the application log file 104 into log lines 117, timestamp and hash signature can be used to perform additional validation of the received relations, actions that are performed by log collector 107 in this case are depicted in FIG. 5.

Note that regardless of the chosen approach, if the first log line mapping entry 316 in the index 308 is about to be written, it may be helpful to include with the entry any additional information on the position of the application log line 117 in the log file 104 to which the entry relates to.

When log viewer 110 receives a request 120 from a user 112 to present data from a log file for a specified period, it attempts to receive 116 that data from log repository 109. If there is no suitable data in the repository, log viewer 110 sends request 122 directly to log collector 107. Log collector 107 forwards the request 123 to suitable host agent 105, which is responsible for gathering log file metadata 102 and raw log file 104 and sending them back to log collector 107. Next, log collector 107 correlates and stores 124 received data in log repository 109. Depending on the mode specified by the user, either raw log lines or grouped ones are shown. To display grouped log lines, log viewer 110 requests group definitions 126 from log data analyzer 108. To fulfill the request, log data analyzer 108 fetches 125 necessary input data, i.e., log lines 118 and corresponding call point descriptors 119 from log repository 109.

FIG. 4 depicts actions that are performed by placed sensors 207, 208 and log agent 100 code when an instrumented method of a logging framework that includes a call point inferring sensor has been executed 400. First, the JVM is requested for the call stack of the current thread 401. Next, the call stack is traversed to find a frame (f) with an application method that called one of the logging framework methods designed to log data 402. One of the possible approaches here is to enumerate the names of all the logging framework methods that are typically directly called by application code to log data, find one of such methods on the call stack and choose the previous stack frame (i.e., the one that was put on the stack earlier). Another alternative is to find the first frame (f) that does not come from the application logging framework itself, e.g., by checking class and package names and comparing them with respective names that are used in the particular logging framework. Once the frame (f) is found, the call point descriptor (cp) is computed 403, which can be denoted, for example, as a pair consisting of fully qualified class name and source code line number.

Logging frameworks (e.g., Logback) typically support two types of strategies for writing data to log files:
 1. Synchronous, in which calls to methods responsible for performing actual write operations happen in the same thread in which the invocation for logging data by monitored application is called,
 2. Asynchronous, where writing to files happen in a separate thread and the actual request to log an event by monitored application results in placing respective data in a queue.

In order to be able to handle both the cases relevant mapping between the log event and its call point descriptor is stored in a map in memory (callPointMap) 404. This map is used to exchange data between call point inferring sensor and call point saving sensor and is therefore accessible for both sensors. Once the log event is about to be written to a file 405, the following operations are performed. The call point descriptor (cp) of the event is retrieved from the callPointMap 406. Next, the call point index 307 is analyzed 407 to find respective identifier (cp_id) for the call point descriptor (cp) 408. If there is no entry for (cp), then the call point descriptor is added to the index and its identifier (cp_id) is assigned 409. Afterwards, log line descriptor (ld) is constructed 410, as mentioned previously it may contain various information which impact the complexity and reliability of the log data parsing and analysis procedure. For example, the descriptor can consist of log line timestamp, hash signature computed using any hashing function such as MurmurHash3 of the log line 117 and log line size, which may be used in determining log line boundaries. Next, an entry consisting of log line descriptor (ld) and respective call point identifier (cp_id) is stored in log line mapping index 411 and the process ends with step 412.

Splitting a log file into collections of log lines, which in general can span across multiples lines, as was discussed above, might not be a trivial task. FIG. 5 provides a flow chart of a process that can be realized by log collector 107 to extract log lines from a log file using information from metadata and store the relation between log line and call point descriptor in log repository 109. Here it is important that the order of entries in log line mapping index is the same as the order in which log lines are written and log line descriptor contains information on log line size in bytes. After the raw log file and corresponding indexes are fetched 501, each entry in log line mapping index is analyzed in a loop 502. First, log line descriptor (ld) in a current entry from log line mapping index is analyzed 503 to obtain the log line size (ls) 504. Next (ls) bytes from log file is read and the data is interpreted as a log line (l) 505. Based on call point identifier (cp_id) included in log line descriptor (ld), corresponding call point descriptor (cp) for the log line (l) is retrieved from call point index 506 and the relation between log line and its call point descriptor is stored in log repository 507. Once all the entries in log line mapping index are analyzed the process ends with step 508. If metadata has been organized in such a way that there is no simple indicator on log line boundaries, log collector must do some additional processing, e.g., it can look for time and date fields which usually indicates a beginning of a new log line. Alternatively, additional information on the structure of the log line may be read by one of the sensors, which for example may contain the configured timestamp format, log field separators, field types and their position in the log line. Such information may be then used to simplify computation of log line boundaries. It also can be used to provide more advance filtering and processing capabilities in log viewer 110. Information about a log line 117 which may optionally include any combination of the log line properties like timestamp, size, above-mentioned structure data or information on the position of the log line 117 in the log file 104 forms metadata of the log line. Such metadata can be optionally included in a log line descriptor 314.

Referring now to FIG. 6, which describes steps performed by log analyzer 108 to fulfill the request 600 for providing an assignment of log lines to groups. After the collections of lines to analyze is fetched 601, each log line (l) is examined in the following loop 602. First, log line is removed from input collection 603. Next, call point descriptor (cp) of the log line (l) is retrieved from log repository 604. The log line to call point descriptor assignment was created in log repository 109 by log collector 107, see FIG. 5, element 507. If there exists a group (g) for the call point descriptor 605, then the line (l) is assigned to that group 606, otherwise a new group is created 607, and next the assignment to that group is made 606. The process ends with step 608, if all the log lines are analyzed.

It is worth mentioning that an application can be compiled without information about line numbers. Although it is not very common practice, possible modifications of the disclosure will be discussed that may be beneficial in such situations. Such alternative approaches may use other identification data that is also available in compiled code, like an opcode index or a command index to report and identify the position of detected logging code invocations. For example, one of possible approaches applicable, e.g., to applications running under JVM, is to use bytecode index instead of source code line number and additionally a method signature. The bytecode index is defined as the index (integer number) in code array containing the execution point for given stack frame. The method signature contains information allowing on identification of the method and its code array in a particular class. Such a signature typically includes the method name and information about its arguments. The term method signature can also refer to class constructors and initializers. Referring now to FIGS. 7a and 7b, which provides example Java code with invocations of logging framework methods, FIG. 7a, placed in lines 10 and 11. In FIG. 7b, code arrays for the class as returned by javap (The Java Class File Disassembler) tool are presented. In particular the first logger.info( . . . ) method invocation corresponds to the bytecode index of 5 in testMethod( ) code array and the second invocation corresponds to the bytecode index of 15 in the same code array. Therefore, the values 5 and 15 are used in place of source line numbers 10 and 11, which are not available in runtime. Note that in the described invention it is sufficient to distinguish different logging calls in a method, initializer, or constructor and such a distinction is provided by bytecode index. One small limitation of the approach concerns logging code placed in instance initializer blocks. Since the blocks are copied to each constructor in a class, invocations of logging methods placed in the blocks will be reported in separate groups created for each of the constructors.

Since, assuming we do not use the index for compiled code discussed above, log line grouping performed by log analyzer when line numbers are not available can be based only on class names and method names (or method signatures), obtained groups may contain log entries coming from multiple templates. Another approach that can be taken in such a situation involves analyzing log lines content within each of such group to further split it to smaller clusters in which lines come from the same template. Various methods can be used to perform such a clustering. In particular, this can be done using any of known log parsing algorithms, e.g., P. He, J. Zhu, Z. Zheng and M. R. Lyu, "Drain: An Online Log Parsing Approach with Fixed Depth Tree," 2017 *IEEE International Conference on Web Services (ICWS)*, Honolulu, Hi., 2017, pp. 33-40, doi: 10.1109/ICWS.2017.13 which is incorporated in its entirety by reference. Alternatively, the parsing method described in U.S. Patent Publication Application No. 2019/386819 entitled "Method And System For Log Data Analytics Based On SuperMinHash Signatures" is incorporated by reference and can also be used for such purpose. Since the methods responsible for analysis of log line contents are executed individually for each of group obtained from log analyzer, the overall accuracy of such hybrid approach should be superior (or at least the same) comparing to using any of the methods individually for analyzing the whole log file.

Once grouping has been accomplished a header for each individual group can be computed, which (ideally) should look similar the actual log event message template, e.g., "Getting configuration from device *, for user * finished in *". The header can be created, for example, by choosing tokens, which appears in all log messages in a particular group and by putting "*" in place of tokens that vary in the group. Such a header can be shown to the user in log viewer 110. Additionally, the header can be used as a group identifier which is not dependent on possible class, method signature and line number (or bytecode index) changes in newer versions of the same application.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for analyzing log files in a distributed computer system, comprising:
  receiving, by a log analyzer, a plurality of log entries from a log repository, where each log entry describes an event which occurred during execution of an application;
  for each log entry in the plurality of log entries, capturing, by one or more sensors, a given call point descriptor associated with a given log entry during execution of the application on a host computing device, where the call point descriptor identifies a location within the application from which the given log entry originated and the one or more sensors is instrumented into the application;
  grouping, by the log analyzer, log entries according to the captured call point descriptors; and
  reporting, by the log analyzer, grouped log entries to a system user, where the log analyzer is implemented by computer executable instructions executed by a computer processor of a monitoring computer.

2. The method of claim 1 wherein the call point descriptor is comprised of a fully qualified class name and a line number in source code of the application.

3. The method of claim 1 wherein the call point descriptor is comprised of a fully qualified class name, a method signature and an index for compiled code.

4. The method of claim 1 wherein capturing a call point descriptor further includes instrumenting an inferring sensor into one or more methods of a logging framework that are invoked during the post of log entries, and instrumenting a saving sensor into one or more methods of the logging framework that are invoked during the writing of log entries to a log file.

5. The method of claim 4 wherein capturing a call point descriptor further includes
  receiving, by the saving sensor, a given log entry;
  determining, by the saving sensor, a log entry descriptor for the given log entry; and storing the log entry descriptor for the given log entry, along with the given call point identifier, in a non-transitory storage medium on the host computing device.

6. The method of claim 5 wherein the log entry descriptor is further defined as a hash value for content of the given log entry.

7. The method of claim 5 wherein the log entry descriptor includes metadata describing the log line.

8. The method of claim 5 wherein storing the log entry descriptor further comprises storing the given call point descriptor, along with an identifier for the given call point descriptor, in a first storage medium, and storing the log entry descriptor for the given log entry, along with the identifier for the given call point descriptor, in a second storage medium.

9. The method of claim 1 wherein grouping log entries further includes, for each log entry in the plurality of log entries, determining a log entry descriptor for a particular log entry and retrieving the call point descriptor associated with the particular log entry using the log entry descriptor, and sorting the log entries in the plurality of log entries by the associated call point descriptor.

10. A computer-implemented method for analyzing log files in a distributed computer system, comprising:
instrumenting, by a log agent, methods of a logging framework with at least one sensor, where the log agent is instrumented into an application executing on a host computing device and the log agent is implemented by computer executable instructions executed by a computer processor of the host computing device;
receiving, by the at least one sensor, a given log entry;
determining, by the at least one sensor, a given call point descriptor for the given log entry during execution of the application, where the call point descriptor identifies a location within the application from which the given log entry originated;
determining, by the at least one sensor, a log entry descriptor for the given log entry; and
storing, by the at least one sensor, log file metadata in a non-transitory storage medium on the host computing device, where the log file metadata includes the log entry descriptor for the given log entry, along with the given call point descriptor for the given log entry.

11. The method of claim 10 wherein the call point descriptor is comprised of a fully qualified class name and a line number in source code of the application.

12. The method of claim 10 wherein the call point descriptor is comprised of a fully qualified class name, a method signature and an index for compiled code.

13. The method of claim 10 wherein instrumenting methods of a logging framework further comprises instrumenting an inferring sensor into one or more methods of the logging framework that are invoked during the post of log entries, and instrumenting a saving sensor into one or more methods of the logging framework that are invoked during the writing of log entries to a log file.

14. The method of claim 10 wherein storing the log entry descriptor further comprises storing the given call point descriptor, along with an identifier for the given call point descriptor, in a first storage medium, and storing the log entry descriptor for the given log entry, along with the identifier for the given call point descriptor, in a second storage medium.

15. The method of claim 10 further comprises
receiving, by a log collector, a plurality of log entries from a log file, where the log file resides on the host computing device, where the log collector is implemented by computer executable instructions executed by a computer processor of a monitoring computer and the monitoring computer is interconnected via a network with the host computing device;
retrieving, by the log collector, log file metadata for the plurality of log entries from the non-transitory storage medium on the host computing device;
correlating, by the log collector, the log file metadata with the plurality of log entries; and
storing, by the log collector, the correlated log file metadata in a log repository.

16. The method of claim 15 further comprises
retrieving, by a log analyzer, the plurality of log entries from the log repository;
grouping, by the log analyzer, log entries according to the call point descriptors; and
reporting, by the log analyzer, grouped log entries to a system user, where the log analyzer is implemented by computer executable instructions executed by the computer processor of the monitoring computer.

17. A computer-implemented system for analyzing log files, comprising:
a log agent instrumented into an application executing on a host computing device and configured to instrument methods of a logging framework with one or more sensors, where the log agent is implemented by computer executable instructions executed by a computer processor of the host computing device;
the one or more sensors are configured to receive a given log entry and determine a given call point descriptor for the given log entry, where the call point descriptor identifies a location within the application from which the given log entry originated, wherein, upon receiving the given log entry, the one or more sensors determine a log entry descriptor for the given log entry and store log file metadata in a non-transitory storage medium on the host computing device, where the log file metadata includes the log entry descriptor for the given log entry and the given call point descriptor for the given log entry; and
a log analyzer configured to retrieve a plurality of log entries from a log repository, group the plurality of log entries using the log file metadata, and reporting the grouped log entries to a system user, where the plurality of the log entries are grouped according to call point descriptors associated with each of the log entries.

18. The system of claim 17 wherein the one or more sensors include an inferring sensor instrumented into one or more methods of the logging framework that are invoked during the post of log entries, and instrumenting a saving sensor into one or more methods of the logging framework that are invoked during the writing of log entries to a log file.

19. The system of claim 17 wherein the saving sensor stores the given call point descriptor, along with an identifier for the given call point descriptor, in a first storage medium, and stores the log entry descriptor for the given log entry, along with the identifier for the given call point descriptor, in a second storage medium.

20. The system of claim 17 wherein the log analyzer resides on the monitored host computer.

21. The system of claim 17 wherein the log analyzer resides on a monitoring computer and is implemented by computer executable instructions executed by a computer processor of the monitoring computer, where the monitoring computer is interconnected via a network with the host computing device.

22. The system of claim 21 further comprises a log collector configured to receive a plurality of log entries from a log file residing on the host computing device and retrieve log file metadata for the plurality of log entries from the non-transitory storage medium on the host computing device, wherein the log collector correlates the log file metadata with the plurality of log entries and stores the correlated log file metadata in the log repository, where the log collector resides on the monitoring computer.

\* \* \* \* \*